(12) United States Patent
Masumoto

(10) Patent No.: US 8,994,720 B2
(45) Date of Patent: Mar. 31, 2015

(54) DIAGNOSIS ASSISTING APPARATUS, DIAGNOSIS ASSISTING PROGRAM, AND DIAGNOSIS ASSISTING METHOD

(75) Inventor: Jun Masumoto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 802 days.

(21) Appl. No.: 13/190,844

(22) Filed: Jul. 26, 2011

(65) Prior Publication Data

US 2012/0026162 A1 Feb. 2, 2012

(30) Foreign Application Priority Data

Jul. 28, 2010 (JP) .................. 2010-168924

(51) Int. Cl.
*G06T 15/00* (2011.01)
*G06T 19/00* (2011.01)
*G06T 15/08* (2011.01)

(52) U.S. Cl.
CPC ................. *G06T 19/00* (2013.01); *G06T 15/08* (2013.01); *G06T 2215/06* (2013.01)
USPC ........................................................ 345/419

(58) Field of Classification Search
CPC ................. G06T 15/08; G06T 2210/41; G06T 2207/30028; G06T 2207/30172
See application file for complete search history.

(56) References Cited

U.S. PATENT DOCUMENTS 7,369,691 B2 * 5/2008 Kondo et al. .................. 382/128
7,620,224 B2 * 11/2009 Matsumoto ................... 382/128
2006/0279568 A1 * 12/2006 Matsumoto ................... 345/419
2010/0008557 A1 1/2010 Matsumoto
2010/0214283 A1 8/2010 Lobregt et al.

FOREIGN PATENT DOCUMENTS

| JP | 2004-283373 A | 10/2004 |
|---|---|---|
| JP | 2004-313736 A | 11/2004 |
| JP | 2006-167287 A | 6/2006 |
| JP | 2008-543477 A | 12/2008 |
| JP | 2010-017474 A | 1/2010 |

OTHER PUBLICATIONS

Japanese Office Action dated Nov. 12, 2013 issued in Japanese Patent Application No. 2010-168924.
Armin Kanitsar et al., "CPR-Curved Planar Reformation", Visualization 2002, VIS2002, IEEE, Nov. 2002, p. 37-44, vol. 1, Issue 1-1.

* cited by examiner

*Primary Examiner* — Hau Nguyen
*Assistant Examiner* — Ryan M Gray
(74) *Attorney, Agent, or Firm* — Sughrue Mion, PLLC

(57) ABSTRACT

Providing a diagnosis assisting apparatus that allows, in a diagnostic screen of a tubular tissue, easy understanding of the positional relationship between a curved cutting surface represented by a CPR image and the tubular tissue. Extracting a tubular tissue region representing a tubular tissue from volume data obtained by imaging and setting a core line to the tubular tissue, generating a CPR image which includes the core line and a longitudinal section of the tubular tissue region, obtaining the longitudinal section from the CPR image generation means, generating a pseudo three-dimensional image that includes a mark representing the obtained longitudinal section, as well as the tubular tissue in the extracted tubular tissue region based on the volume data, and displaying the pseudo three-dimensional image.

15 Claims, 4 Drawing Sheets

DIAGNOSIS ASSISTING APPARATUS, DIAGNOSIS ASSISTING PROGRAM, AND DIAGNOSIS ASSISTING METHOD

BACKGROUND OF THE INVENTION

1. Field of the Invention

The present invention relates to a diagnosis assisting apparatus, computer program, and method of assisting diagnosis of a tubular tissue through visualization of three-dimensional image data.

2. Description of the Related Art

Technologies for analyzing volume data of an object obtained by CT or the like through CPR method have been developed in order to observe a tubular tissue, such as a blood vessel, intestine, or bronchus as described, for example, in A. Kanitsar et al., "CPR-curved planar reformation", visualization 2002, VIS2002, IEEE Vol. 1, Issue 1-1 November 2002, pp. 37-44 (Non-patent Document 1). CPR method is a technique in which a curved surface passing the centerline of a tubular tissue is specified based on three-dimensional volume data and the specified curved surface is generated as a two-dimensional image. This allows a cross-section of the tubular tissue in the longitudinal direction to be displayed in one screen.

It is customary that, in CPR method, only a CPR image or a pair of CPR image and cross-sectional image orthogonal to the longitudinal direction of a tubular tissue represented by the CPR image is displayed for the observation of the tubular tissue.

For a meandering tubular tissue, such as a blood vessel and the like, however, such display causes the longitudinal section of the tubular tissue represented by the CPR image to become a curved or twisted shape. Consequently, it has been difficult for a user unaccustomed to CPR images to determine in which direction the longitudinal section represented by the CPR image is sectioned at each position of a tubular tissue.

In view of the circumstances described above, it is an object of the present invention to provide a diagnosis assisting apparatus and method that allows easy understanding of positional relationship between a longitudinal section represented by a CPR image and the tubular tissue. It is a further object of the present invention to provide a computer readable recording medium on which is recorded a program for causing a computer to function as the diagnosis assisting apparatus.

SUMMARY OF THE INVENTION

A diagnosis assisting apparatus of the present invention is an apparatus, including:

a tubular tissue extraction means for extracting a tubular tissue region representing a tubular tissue from volume data obtained by imaging and setting a core line to the tubular tissue;

a CPR image generation means for generating a CPR image which includes the core line and a longitudinal section of the tubular tissue region;

a longitudinal section obtaining means for obtaining the longitudinal section from the CPR image generation means;

a pseudo three-dimensional image generation means for generating a pseudo three-dimensional image that includes a mark representing the obtained longitudinal section, as well as the tubular tissue, in the extracted tubular tissue region based on the volume data; and a display control means for causing the pseudo three-dimensional image having the mark to be displayed on a display device.

A diagnosis assisting method of the present invention is a method, including the steps of:

extracting a tubular tissue region representing a tubular tissue from volume data obtained by imaging and setting a core line to the tubular tissue;

generating a CPR image which includes the core line and a longitudinal section of the tubular tissue region;

obtaining the longitudinal section from the CPR image;

generating a pseudo three-dimensional image that includes a mark representing the obtained longitudinal section, as well as the tubular tissue, in the extracted tubular tissue region based on the volume data; and displaying the pseudo three-dimensional image having the mark.

A computer readable recording medium of the present invention is a medium on which is recorded a diagnosis assisting program for causing a computer to function as:

a tubular tissue extraction means for extracting a tubular tissue region representing a tubular tissue from volume data obtained by imaging and setting a core line to the tubular tissue;

a CPR image generation means for generating a CPR image which includes the core line and a longitudinal section of the tubular tissue region;

a longitudinal section obtaining means for obtaining the longitudinal section from the CPR image generation means;

a pseudo three-dimensional image generation means for generating a pseudo three-dimensional image that includes a mark representing the obtained longitudinal section, as well as the tubular tissue, in the extracted tubular tissue region based on the volume data; and a display control means for causing the pseudo three-dimensional image having the mark to be displayed on a display device.

As used herein, the term "CPR image" refers to any of various types of CPR images, including at least straightened CPR image, stretched CPR image, projected CPR image, and multi-path CPR image.

The tubular tissue described above may be any type of tubular tissue as long as CPR processing is applicable and it may be, for example, a blood vessel or a bronchus The pseudo three-dimensional image may be an image represented by a volume rendering method or an image represented by a surface rendering method.

The mark representing the obtained longitudinal section may be anything as long as it is capable of distinguishably indicating the position of the longitudinal section and various types of known marks may be used. That is, the mark may be displayed by giving various transparency values and colors to each pixel constituting the mark. Further the mark may be, for example, a mark that represents only a contour of the longitudinal section. Preferably, the mark is displayed in a manner that allows easy visual recognition of a curved or twisted shape of the longitudinal section. Preferably, the mark is, for example, a curved surface which includes the longitudinal section and has a certain width extending outside of a longitudinal direction of the tubular tissue. Further, it is preferable that the mark is shaded based on an angle of a normal line at each position of the longitudinal section. As used herein, the term "longitudinal section" refers to a surface, which includes a core line of a tubular tissue, along which a curved cutting surface cutting through the tubular tissue projected onto the CPR image in a longitudinal direction passes.

Preferably, the curved surface having a certain width extending outside of a longitudinal direction of the tubular tissue indicates a display range of the CPR image in a visually recognizable manner. For example, the curved surface is a surface representing a curved cutting surface longitudinally cutting the tubular tissue projected onto the CPR image, and the size of the curved surface is a size corresponding to the display range of the CPR image. The term "curved surface represents a curved cutting surface longitudinally cutting the tubular tissue" as used herein refers to, for example, that the contour of the curved surface is similar to that of the curved cutting surface and the positional relationship between the curved surface and tubular tissue is identical to that between the tubular tissue and curved cutting surface. The term "size of the curved surface corresponds to the display range of the CPR image" as used herein refers to, for example, that when a portion of a CPR image generated by the CPR image generation means is displayed on a display device in an enlarged form, the contour of the curved surface in the pseudo three-dimensional image is similar to that of the curved cutting surface corresponding to the display range of the displayed portion of the CPR image and the positional relationship between the curved surface in the pseudo three-dimensional image and tubular tissue is identical to that between the display range of the displayed portion of the CPR image and tubular tissue. Further, a pixel value of each point constituting the mark may represent a pixel value of each corresponding point of the CPR image.

Preferably, the display control means may be a means that causes the mark to be displayed such that the positional relationship between the mark and tubular tissue is easily understood. For example, either one or both of the tubular tissue and curved surface may be displayed in translucent by appropriately weighting the transparency values of the both. For example, only a portion of the pseudo three-dimensional image representing the tubular tissue within a predetermined distance from the core line is displayed.

Further, the CPR image generation means may be a means that generates a CPR image of the curved cutting surface of the tubular tissue region rotated with the core line of the tubular tissue as the axis of the rotation. That is, if the CPR image generation means generates the CPR image of the curved cutting surface of the tubular tissue region rotated with the core line of the tubular tissue as the axis of the rotation, the pseudo three-dimensional image generation means generates a pseudo three-dimensional image having a mark of a longitudinal section in the rotated curved cutting surface. As a result, the display control means may be a means that causes the mark to be rotated in conjunction with the rotation of the CPR image and a pseudo three-dimensional image having the mark to be displayed on a display device.

The CPR image generation means may be adapted to generate a CPR image with respect to the entirety of a tubular tissue regardless of whether or not it is required to be displayed or to generate a CPR image with respect to a portion thereof specified as the observation range. The observation range may be determined automatically or based on a user specification input. For example, an image of the entire tubular tissue region extracted by the tubular tissue extraction means is displayed on a screen as a volume rendering image to have the user to specify the range of the tubular tissue on the screen.

The display control means may be a means that causes the pseudo three-dimensional image having the mark to be displayed on the display device and further the core line of the tubular tissue to be displayed on the pseudo three-dimensional image having the mark in a superimposed manner. Further, it is preferable that the display control means is adapted to cause the CPR image and pseudo three-dimensional image having the mark to be displayed in a manner that allows comparison between them. For example, it is preferable that the display control means is a means that causes the pseudo three-dimensional image having the mark and CPR image to be displayed as a pair of images. As for the pair of images, for example, the pseudo three-dimensional image having the mark and CPR image may be displayed side by side or the CPR image is distinguishably included in the pseudo three-dimensional image having the mark. Further, it is preferable that the diagnosis assisting apparatus of the present invention further includes a storage means for storing the pair of images. Preferably, the pair of images is displayed in a manner in which the pseudo three-dimensional image having the mark is distinguishably included in a portion of the CPR image.

With regard to the extraction of a tubular tissue and setting of a core line by the tubular tissue extraction means, a variety of methods have been proposed and any known method may be used in the present invention. As an example, the method described in Japanese Unexamined Patent Publication No. 2004-313736 may be used to extract a blood vessel region and to set a core line. The core line may be set by manually inputting a plurality of points within the tubular tissue with an input device, such as a mouse, in an image displayed by a volume rendering method or the like and performing spline interpolation on the plurality of inputted points. The term "core line" as used herein refers to a center line of a target tubular tissue connecting the center (gravity center) of each cross-section of the tubular tissue.

According to the apparatus, program recorded on a computer readable recording medium, and method of the present invention, a longitudinal section of a tubular tissue is obtained from the CPR image generation means, then a mark representing the obtained longitudinal section, as well as the tubular tissue, are represented in a tubular tissue region, and a pseudo three-dimensional image having the mark is generated based on the volume data and displayed. This allows a doctor to easily understand the position of the tubular tissue represented in the CPR image by observing the mark indicated in the pseudo three-dimensional image.

If the CPR image generation means is a means that generates a CPR image of a longitudinal section of the tubular tissue region rotated with the core line of the tubular tissue as the axis of the rotation, a pseudo three-dimensional image with a mark rotated according to the rotation of the CPR image is displayed. This allows the position of the longitudinal section to be understood more easily.

If the mark according to the present invention is a curved surface which includes the longitudinal section and has a certain width extending outside of a longitudinal direction of the tubular tissue, the orientation and position of the longitudinal section represented by the CPR image may be understood from the portion extending outside of the longitudinal direction of the tubular tissue from the longitudinal section, as well as from the longitudinal section, the orientation and position of the longitudinal section may be understood more easily.

Further, if the mark of the present invention is a curved surface which represents a curved cutting surface longitudinally cutting the tubular tissue projected onto the CPR image, the orientation and position of the curved cutting surface represented by the CPR image are also understood easily.

Still further, if the mark of the present invention is a curved surface and the size of the curved surface corresponds to the display range of the CPR image, the display range of the curved cutting surface represented by the CPR image may be understood easily.

Further, if the display control means of the present invention is a means that further causes the core line of the tubular tissue to be displayed on the pseudo three-dimensional image having the mark in a superimposed manner, the positional relationship between the longitudinal section, tubular tissue, and core line of the tubular tissue may be understood intuitively.

In the present invention, if the mark is shaded based on an angle of a normal line at each position of the longitudinal section, the orientation of the longitudinal section represented by the CPR image may be understood more intuitively.

Further, in the present invention, if a pixel value of each point constituting the mark represents a pixel value of each corresponding point of the CPR image, the position of each pixel of the longitudinal section represented by the CPR image may be understood intuitively.

In the present invention, only a portion of the pseudo three-dimensional image representing the tubular tissue within a predetermined distance from the core line is displayed, a desired section of the tubular tissue and mark may be prevented from being hidden by other portions of the tubular tissue in the pseudo three-dimensional image and only the desired section of the tubular tissue and mark may be displayed in a manner that allows easy visual recognition.

In the present invention, the display control means is a means that causes the pseudo three-dimensional image having the mark and the CPR image to be displayed as a pair of images, the position of the longitudinal section represented by the CPR image and the position of the longitudinal section in the tubular tissue may be compared easily, the longitudinal section of the tubular tissue may be understood more intuitively.

If a storage means for storing the pair of image is further provided, a CPR image and a pseudo three-dimensional image having a corresponding mark may be stored as a pair of image, whereby the CPR image and pseudo three-dimensional image may be managed collectively which is advantageous in a case, for example, in which a doctor explains diagnostic analysis using a CPR image to a third person, such as another doctor or a patient, not accustomed to CPR image.

Further, where the pair of images is displayed in a manner in which the pseudo three-dimensional image having the mark is distinguishably included in a portion of the CPR image, the user may quickly find out a pseudo three-dimensional image having a mark correspond to a CPR image even, for example, in a case in which images representing cross-sections of a tubular region or a plurality of other images is displayed simultaneously.

DESCRIPTION OF THE PREFERRED EMBODIMENTS

Hereinafter, embodiments of the diagnosis assisting apparatus, diagnosis assisting method, and diagnosis assisting program of the present invention will be described in detail with reference to the accompanying drawings.

Figure 1:
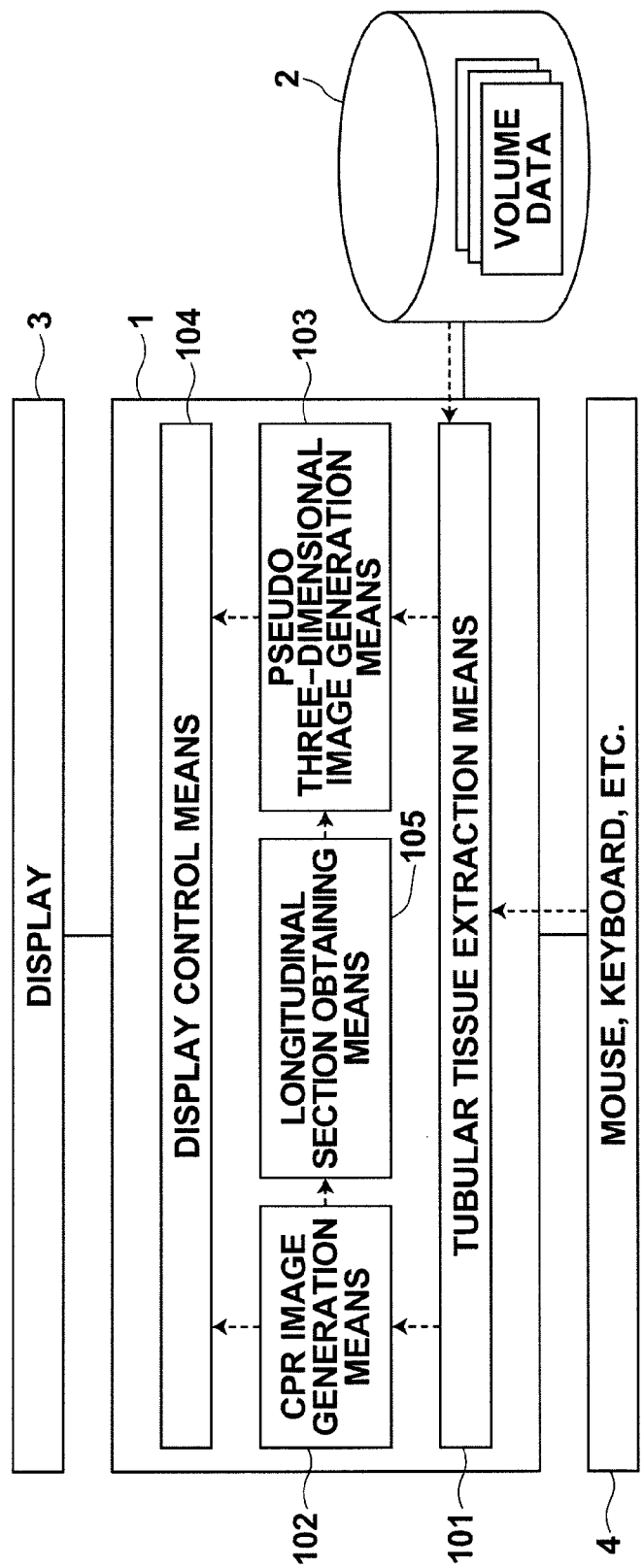
FIG. 1 illustrates a schematic configuration of a diagnosis assisting apparatus according to a first embodiment of the present invention.

FIG. 1 illustrates a schematic configuration of a diagnosis assisting apparatus realized by installing a diagnosis assisting program on a workstation used by a doctor. Diagnosis assisting apparatus 1 includes, as a standard configuration, a processor and a memory (which are not shown in FIG. 1) in addition to storage 2, such as a HDD (Hard Disk Drive) or a SSD (Solid State Drive). Further, display 3 and an input device 4, such as a mouse or a keyboard are connected to diagnosis assisting apparatus 1.

The diagnosis assisting program and data (conversion table to be described later and the like) to be referenced by the program are stored in storage 2 at the time of the installation and loaded in the memory at the time of the activation. The diagnosis assisting program prescribes, as the processing performed by the CPU, tubular tissue extraction processing, CPR image generation processing, pseudo three-dimensional image generation processing, and display control processing. Through execution of each processing described above by the CPU according to the prescription of the program, the general purpose workstation functions as tubular region extraction means 101, CPR image generation means 102 for generating a CPR image representing a longitudinal section of a tubular tissue region including a core line, pseudo three-dimensional image generation means 103 for generating a pseudo three-dimensional image that includes a mark representing the obtained longitudinal section, as well as the tubular tissue, in the extracted tubular tissue region based on the volume data, display control means 104 for causing display 3 to display the mark containing pseudo three-dimensional image, and longitudinal section obtaining means 105 for obtaining the longitudinal section from CPR image generation means 102.

Storage 2 includes volume data transferred from the inspection department in charge of imaging or obtained through data base retrieval. The volume data may be those directly outputted from a multi-slice CT system or the like or those generated by restructuring a group of two-dimensional slice-data outputted from a conventional CT system or the like.

When a selection of a predetermined diagnosis assisting function from a selection menu is detected, diagnosis assisting apparatus 1 prompts the user to select or input data required for identifying volume data. When volume data are identified by the user operation, the identified volume data are loaded in the memory from storage 2.

It is assumed here that chest imaging will be performed by a multi-slice CT system and volume data which include cardiac and coronary artery information will be obtained in an examination of a certain patient. When the user selects a diagnosis assisting function for a coronary artery of tubular tissue and inputs an identifier of the patient and examination data, corresponding volume data are loaded in the memory and a diagnosis assisting process of the present invention is performed.

Figure 2:
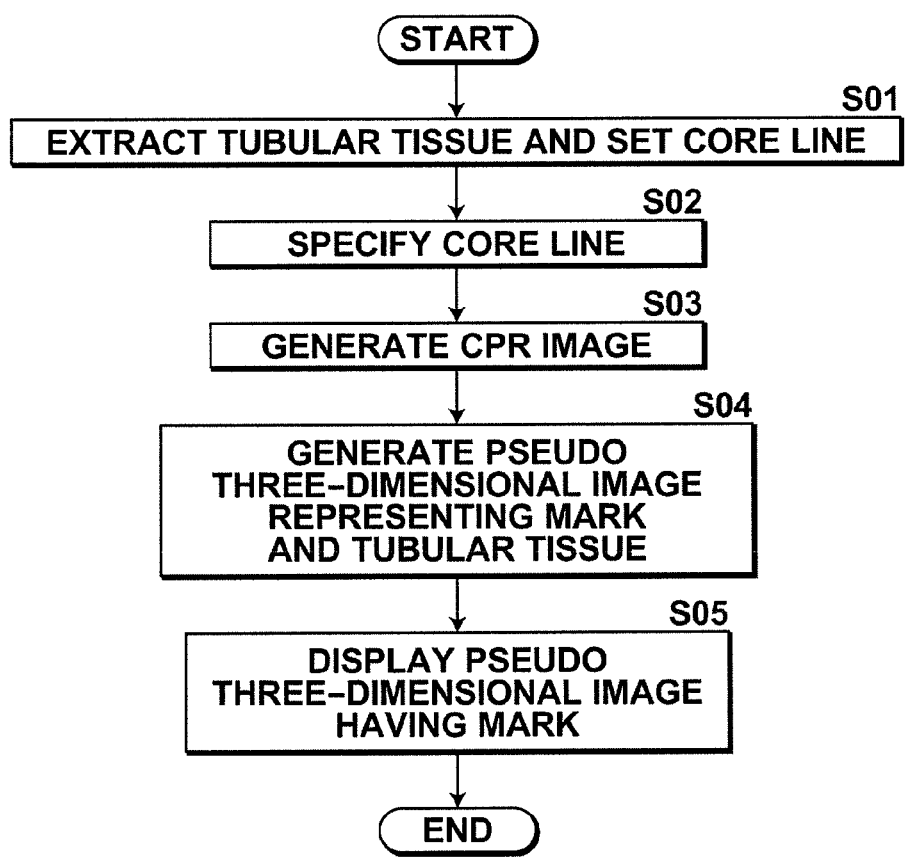
FIG. 2 is a flowchart illustrating a preferred embodiment of a diagnosis assisting method of the present invention.
Figure 3:
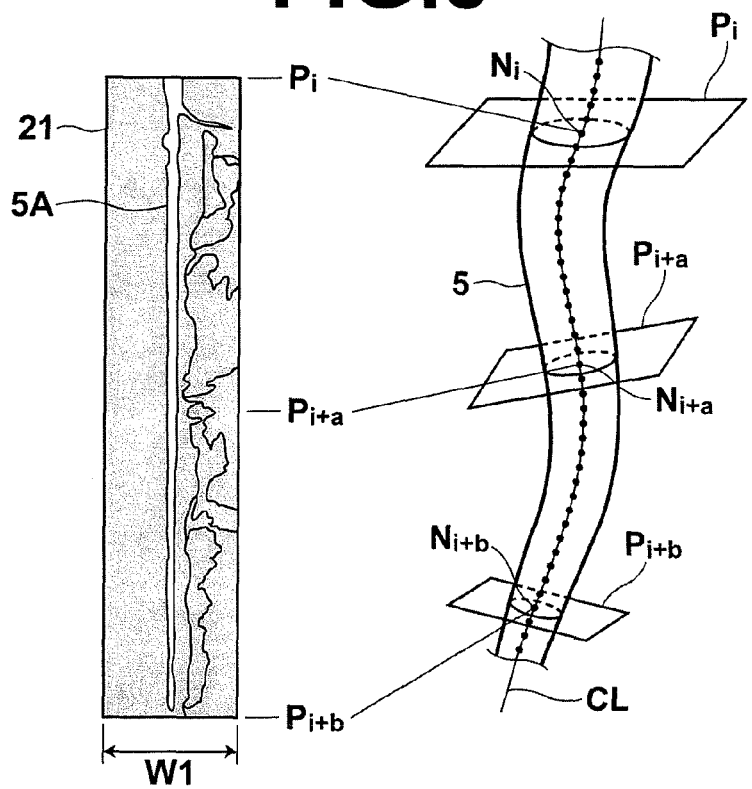
FIG. 3 schematically illustrates straightened CPR image generation processing.
Figure 4:
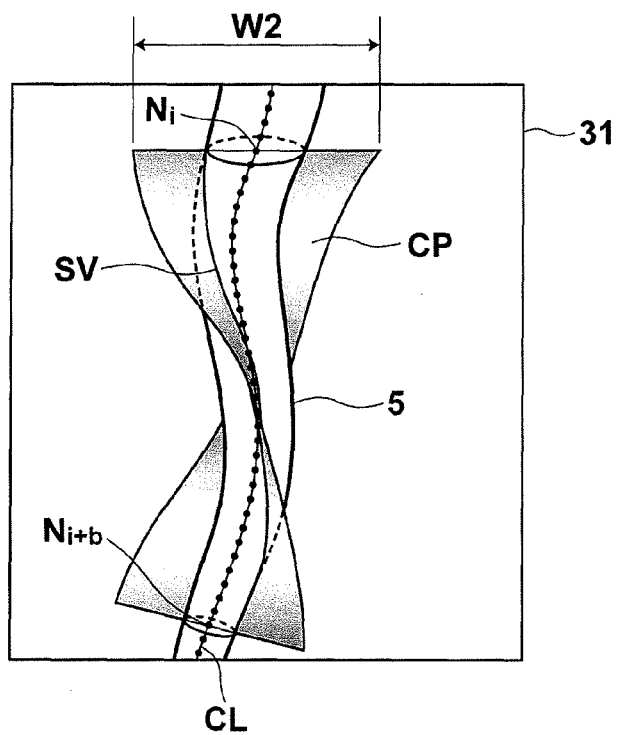
FIG. 4 illustrates an example of a displayed pseudo three-dimensional image.

FIG. 2 is a flowchart illustrating a preferred embodiment of a diagnosis assisting method of the present invention. FIG. 3 schematically illustrates straightened CPR image generation processing, and FIG. 4 illustrates an example of a pseudo three-dimensional image having a mark representing a curved cutting surface attached thereto. A diagnosis assisting method of the present embodiment will be described with reference to FIGS. 2 to 4.

Tubular region extraction means 101 extracts a coronary artery region with the outer wall thereof as the contour from the volume data described above. That is, tubular tissue 5 is formed of voxel data representing the blood vessel wall, inside of the blood vessel wall, and lumen of the blood vessel. Further, tubular region extraction means 101 sets a core line of the coronary artery and a plurality of cross-sections orthogonal to the core line (S01).

Tubular region extraction means 101 extracts a tubular tissue region representing a tubular tissue from volume data obtained by imaging and sets a core line of the tubular tissue.

In the present embodiment, tubular region extraction means 101 extracts a coronary artery region by the method proposed in Japanese Patent Application Nos. 2009-48679 and 2009-69895. In this method, positions of a plurality of candidate points constituting a core line of a coronary artery and a main axis direction are calculated based on the values of voxel data constituting volume data. Alternatively, position information of a plurality of candidate points constituting a core line of a coronary artery and a main axis direction are calculated by calculating a Hesse matrix for the volume data and analyzing eigenvalues of the calculated Hesse matrix. Then, a characteristic amount representing a likelihood of a coronary artery is calculated for each voxel data adjacent to each candidate point and a determination is made as to whether or not each voxel data represents a coronary artery region based on the calculated characteristic amount. The characteristic amount based determination is made based on an evaluation function obtained in advance through machine learning. This extracts tubular tissue 5 as shown in FIG. 3 by way of example.

In the aforementioned method, a core line of the coronary artery is set in the course of extracting tubular tissue 5. Further, the position and main axis direction are calculated with respect to each candidate point forming the core line. Therefore, a cross-section orthogonal to the main axis direction (orthogonal cross-section) can be set at each candidate point based on the calculated information. Cross-sections may be set after tubular tissue 5 has been extracted or immediately after the main axis direction has been calculated with respect to each cross-section. Further, cross-sections may be set at all candidate points or at some sampled candidate points.

When tubular tissue 5 is extracted, pseudo three-dimensional image generation means 103 generates a volume rendering image of tubular tissue 5. Then, pseudo three-dimensional image generation means 103 combines a mark indicating the core line set by the aforementioned processing with the volume rendering image and outputs the combined image to display 3. Then, tubular region extraction means 101 receives an input from input device 4 for setting an observation range. For example, an observation range is set by the user by specifying one of a plurality of branch vessels constituting a coronary artery in the volume rendering image and specifying starting and endpoints of the observation range on the passage of the branch vessel (S02).

Operations that may be accepted with respect to the volume rendering image may include core line route changing, core line extension, and the like, other than the observation range setting. When an operation for changing the route or the like is detected, tubular region extraction means 101 resets the core line or cross-sections according to the content of the operation.

Information of the tubular tissue, core line, and cross-sections, and information of the observation range specified by the user are supplied from tubular region extraction means 101 to CPR image generation means 102 and pseudo three-dimensional image generation means 103.

Hereinafter, with reference to FIG. 3, processing performed by CPR image generation means 102 will be described by taking a coronary artery as an example of the tubular tissue. The left side of FIG. 3 illustrates an example of a straightened CPR image generated by CPR image generation means 102. The right side of FIG. 3 schematically illustrates a portion of tubular tissue 5 extracted by tubular region extraction means 101. It is assumed that candidate points and cross-sections set by tubular region extraction means 101 can be distinguished by identification numbers starting with 1, in which an $n^{th}$ candidate point is denoted as $N_n$ and a cross-section which includes the $n^{th}$ candidate point is denoted as $P_n$. Suffixes "i", "i+a", and "i+b" indicate, by way of example, $i^{th}$ candidate point, $(i+a)^{th}$ candidate point, and $(i+b)^{th}$ candidate point of all set cross-sections (where, a<b).

CPR image generation means 102 generates straightened CPR image 21 shown in FIG. 3 based on the information indicated on the right side of FIG. 3 (S03). That is, CPR image generation means 102 generates straightened CPR image 21 by a known procedure using the information (tubular tissue 5, position of each candidate point and main axis direction at each candidate point, core line route, positions and orientations of cross-sections, and the like) obtained by tubular region extraction means 101.

In the process of generating straightened CPR image 21, CPR image generation means 102 sets a curved cutting surface which is a curved surface cutting the tubular region in the longitudinal direction, including core line CL, according to a known algorithm. In order to set the curved cutting surface, information that specifies the curved cutting surface, such as the projection range to be projected on the curved cutting surface, coordinates of each point constituting the curved cutting surface and pixel value of each point, normal line direction at each position on the curved cutting surface, and the like.

In the present embodiment, CPR image generation means 102 selects a branch vessel on which starting and end points of observation range is set and generates a straightened CPR image representing the region of the branch vessel from the starting point to end point as the observation range. When an operation for changing the display range within the observation range, such as enlargement or the like, is detected, this allows display control means, to be described later, to rapidly change the display range using the generated CPR image. For the extraction of the blood vessel region and core line, various types of known techniques, such as those disclosed in Japanese Unexamined Patent Publication No. 2004-313736 and the like may be used. The method of generating the CPR image is not limited to the present embodiment, and various known technologies, such as that described in Japanese Unexamined Patent Publication No. 2004-283373 may be used. Further, CPR image generation means 102 may be adapted to generate, based on information of observation range, a CPR image representing only the observation range.

Longitudinal section obtaining means 105 obtains information necessary to display marks of information for specifying longitudinal section 5A set by CPR image generation means 102, information for specifying the curved cutting surface, information for specifying a range to be projected on the curved cutting surface CP and supplies the obtained information to pseudo three-dimensional image generation means 103. Pseudo three-dimensional image generation means 103 generates mark SV representing the longitudinal section, mark CP representing the curved cutting surface, and a pseudo three-dimensional image representing tubular tissue 5 from the volume data and information specifying curved cutting surface CP, as shown in FIG. 4 (S04).

In the present embodiment, pseudo three-dimensional image generation means 103 sets a depth map the defines a depth in space from a predetermined point to each coordinate point constituting the curved cutting surface in a three-dimensional coordinate space and does not perform volume rendering processing for the pseudo three-dimensional image with respect to a space further away from each coordinate point constituting the curved cutting surface viewed from the predetermined point. In this way, pseudo three-dimensional image generation means 103 generates a volume rendering image of tubular tissue 5 with curved surface CP corresponding to the curved cutting surface attached thereto. Further, pseudo three-dimensional image generation means 103 performs shading on curved surface CP representing the curved cutting surface by a known method based on the angle of normal line of the curved surface, as shown in FIG. 4.

As for the method employed by pseudo three-dimensional image generation means 103 for indicating a mark in a pseudo three-dimensional image representing a tubular tissue, various known method may be used. For example, as the three-dimensional coordinate space of volume data and the three-dimensional coordinate space of each point constituting curved surface CP obtained from longitudinal section obtaining means 105 correspond to each other, the curved cutting surface and longitudinal section may be added to pseudo three-dimensional image 31 by giving a predetermined transparency value or a predetermined pixel value to each pixel of the volume data corresponding to each coordinate position constituting curved surface CP. Alternatively, for example, an arrangement may be made in which a pseudo three-dimensional image of curved surface CP representing the curved cutting surface and longitudinal section is generated by aligning the three-dimensional coordinate space of volume data with the three-dimensional coordinate space of each point constituting curved surface CP obtained from longitudinal section obtaining means 105, then a pseudo three-dimensional image representing the tubular tissue is generated separately, and the two images are displayed in a superimposing manner by giving predetermined weighted transparency values.

Preferably, for a largely twisted section of a tubular tissue, such as a distal portion of a blood vessel, curved cutting surface CP is generated as a smooth curved surface by any known interpolation method in order to avoid discontinuity of the coordinates and pixel value of each point constituting longitudinal section SV and curved cutting surface CP.

Display control means 104 causes the pseudo three-dimensional image with the marks attached thereto generated by pseudo three-dimensional image generation means 103 to be generated on display 3 (S05).

According to the present embodiment described above, by displaying a pseudo three-dimensional image which includes marks, the doctor may easily understand the position of a tubular tissue represented by a CPR image by observing the mark indicating the longitudinal section represented by a pseudo three-dimensional image generated from volume data.

Further, in the present embodiment, pseudo three-dimensional image generation means 103 displays curved surface CP representing a curved cutting surface as a mark, as shown in FIG. 4, so that the orientation and position of the curved cutting surface represented by CPR image may be understood easily. Still Further, a pseudo three-dimensional image is generated in which mark SV representing the longitudinal section is distinguishably indicated on curved surface CP representing the curved cutting surface, so that the user may easily understand the positional relationship between the longitudinal section and tubular tissue.

Still further, in the present invention, pseudo three-dimensional image generation means 103 generates CPR image 21 and pseudo three-dimensional image 31 with the mark attached thereto such that the size of the mark of curved cutting surface CP corresponds to the display range of the CPR image displayed on display 3 by a known method based on the display range of the CPR image. That is, the length of curved surface CP in FIG. 4 corresponds to the longitudinal length of CPR image 21 from $N_i$ to $N_{i+b}$ in FIG. 3 and width W2 of the curved surface CP in FIG. 4 corresponds to display range W1 of CPR image 21. In this case, when CPR image 21 is displayed in an enlarged or reduced form by a user operation of mouse 4 or the like, the size of the mark of curved cutting surface CP in pseudo three-dimensional image 31 may be enlarged or reduced temporarily in conjunction with the enlargement or reduction of CPR image 21. Consequently, the user may easily understand the display range of the curved cutting surface represented by the CPR image.

Further, as shown in FIG. 4, the marks of the present embodiment are shaded based on the angle of normal line at each position in the longitudinal section and curved cutting surface, so that the orientation of the longitudinal section represented by the CPR image may be understood easily. Consequently, the user may easily understand the curved shape or twisted shape of the longitudinal section, and hence may understand the orientation at each position in the curved surface CP and longitudinal section with intuitive easiness.

Further, in the present embodiment, display control means 104 causes CPR image 21 set by CPR image generation means 102 and pseudo three-dimensional image 31 to be displayed on display 3 in parallel. Although only pseudo three-dimensional image 31 may be displayed on display 3, but the parallel display is preferable because it allows analysis of the CPR image 21 by comparing the positions between curved cutting surface CL represented by CPR image 21 and tubular tissue.

As shown in FIG. 4, the mark of the present embodiment is a curved surface which includes a longitudinal section and have a certain width extending outside of the longitudinal direction of the tubular tissue, so that the longitudinal section, and orientation and position of a curved cutting surface may be understood easily from the longitudinal section and a portion extending outside of the longitudinal direction of the tubular tissue from the longitudinal section.

Display control means 104 of the present embodiment causes core line CL to be displayed superimposed on a pseudo three-dimensional image with marks CP and SV attached thereto, as shown in FIG. 4. This is preferable because the relationship between the longitudinal section, tubular tissue, and the core line of the tubular tissue may be understood easily.

It should be understood that the present invention is not limited to the embodiments described above, and various modifications may be made without departing from the spirit of the present invention.

Preferably, CPR image generation means 102 is a means that generates a CPR image of a curved cutting surface, including a longitudinal section of a tubular tissue, rotated with the core line of the tubular tissue as the axis of the rotation by a known method, longitudinal section obtaining means 105 is a means that obtains information that specifies the rotated longitudinal section 5A set by CPR image generation means 102 and information necessary to specify a range to be projected on the curved cutting surface and the like and supplies the obtained information to pseudo three-dimensional image generation means 103, and pseudo three-dimensional image generation means 103 is a means that generates a pseudo three-dimensional image with a mark indicating the rotated longitudinal section or a mark that indicates the rotated longitudinal section and curved surface attached thereto. In this case, a pseudo three-dimensional image generated by rotating a mark corresponding to the displayed CPR image according to the rotation of the CPR image is displayed, so that the positions of the curved cutting surface and longitudinal section may be understood easily.

Preferably, for example, display control means 104 has a function to cause a portion of pseudo three-dimensional image 31 generated by pseudo three-dimensional image generation means 103 within a certain distance from core line CL to be displayed.

It is possible to prevent a desired section of a tubular tissue and mark from being hidden by other portions of the tubular tissue in a displayed pseudo three-dimensional image and to display only the desired section of the tubular tissue and mark in a manner that allows easy visual recognition. Such function may be achieved by limiting the range of a pseudo three-dimensional image generated by pseudo three-dimensional image generation means 103, instead of being provided in display control means 104. The function to cause a portion within a certain distance from core line CL to be displayed may be realized by various known methods, such as a method in which a pixel located outside of a certain range from core line CL is set transparent and the like. Further, a portion of pseudo three-dimensional image 31 generated by pseudo three-dimensional image generation means 103 outside of a certain range from core line CL may be identifiably displayed, for example, by making the portion translucent.

In the present embodiment, the pixel value of each point constituting marks CP and SV may be a pixel value representing that of each corresponding point of the CPR image. In this case, the position of each pixel of the longitudinal section represented by the CPR image may be understood easily.

Further, display control means 104 may be a means that causes either one or both of tubular tissue 5 and curved surface to be displayed in translucent by appropriately weighting the transparency values of the both. This allows the user to easily understand the positional relationship between the mark and tubular tissue.

Figure 5:
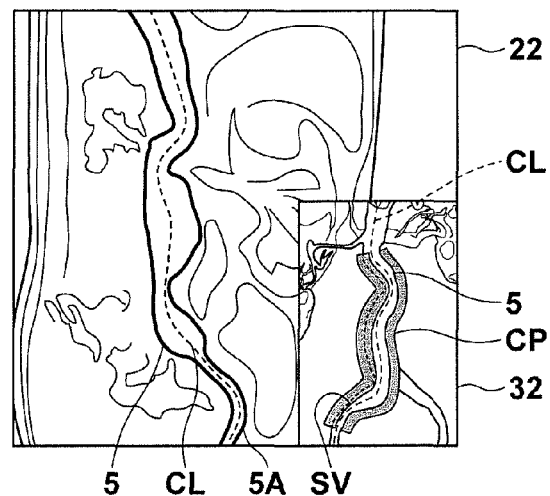
FIG. 5 illustrates an example display of a CPR image with an attached mark corresponding to a stretched CPR image and a pseudo three-dimensional image.

A display example of stretched CPR image 22 with respect to an abdominal aorta and a right common iliac artery of a tubular tissue and a pseudo three-dimensional image 32 with a mark corresponding to stretched CPR image 22 caused by a modification of display control means 104 is shown in FIG. 5. In FIG. 5, an image in which a pseudo three-dimensional image which includes mark CP representing a curved cutting surface of stretched CPR image is identifiably displayed in a portion of CPR image 22 in one display window. Display of pseudo three-dimensional image 32 and CPR image 22 by relating them to each other as a pair of images in the manner described above allows the user to quickly find out a pseudo three-dimensional image having a mark correspond to a CPR image even, for example, in a case in which images representing cross-sections of a tubular region or a plurality of other images is displayed simultaneously. Further, by storing a CPR image and a pseudo three-dimensional image having a corresponding mark in storage 2 as a pair of images like that shown in FIG. 5, the CPR image and pseudo three-dimensional image may be managed collectively which is advantageous in a case, for example, in which a doctor explains diagnostic analysis using a CPR image to a third person, such as another doctor or a patient not accustomed to CPR image.

With respect to the example shown in FIG. 5 in which a pseudo three-dimensional image having a mark corresponding to a CPR image is identifiably displayed in a portion of the CPR image in one display window, the CPR image and pseudo three-dimensional image having a mark corresponding to the CPR image attached thereto may be displayed or stored by relating them in any way by a known method as long as it is capable of displaying the pair of images in one display window. For example, when storing the pair of images, the pair of images may be stored as a single image by specifying the display window with an input device, such as a mouse, with an image in which a pseudo three-dimensional image with a mark corresponding to a CPR image is identifiably displayed in a portion of the CPR image in one display window as in FIG. 5, without separately recognizing the CPR image and pseudo three-dimensional image with the mark attached thereto by a known capturing function or the like in the image of the specified displayed window. Further, instead of storage 2, the pair of images may be stored in various types of storage devices connected through a network.

Further, a pair of images may be related in any way as long as a CPR image and a pseudo three-dimensional image with a mark corresponding to the CPR image are displayed or managed collectively. They may be displayed or stored in a variety of ways including, for example, the following. The CPR image and pseudo three-dimensional image with a mark corresponding to the CPR image are displayed or stored as an image in which they are arranged in parallel or as an image in which the CPR image is embedded in the pseudo three-dimensional image with the mark. Otherwise, the CPR image and pseudo three-dimensional image with the mark may be stored as separate images and when either one of the images is displayed the other image is also displayed automatically, or they may be displayed in separate windows connected to each other so that it is recognizable that the CPR image and pseudo three-dimensional image with the mark are related.

As for the mark indicating the longitudinal section or curved cutting surface, any of various types of known marks may be used as long as it is capable of identifiably indicating the position of the longitudinal section. The mark may be displayed by giving various transparency values and colors to pixels constituting the mark. The mark may be, for example, a mark that represents only a contour of a longitudinal section.

Curved surface CP represented as a mark may be a surface that represents the entire curved cutting surface longitudinally cutting a tubular tissue projected on a generated CPR image. This is also preferable since orientations and positions of the curved cutting surface represented by the CPR image and longitudinal section may be understood easily. In this case, it is further preferable to identifiably display a region corresponding to the display range of the CPR image on the corresponding curved surface since the display range of the CPR image corresponding to the set observation range may be understood easily.

Figure 6:
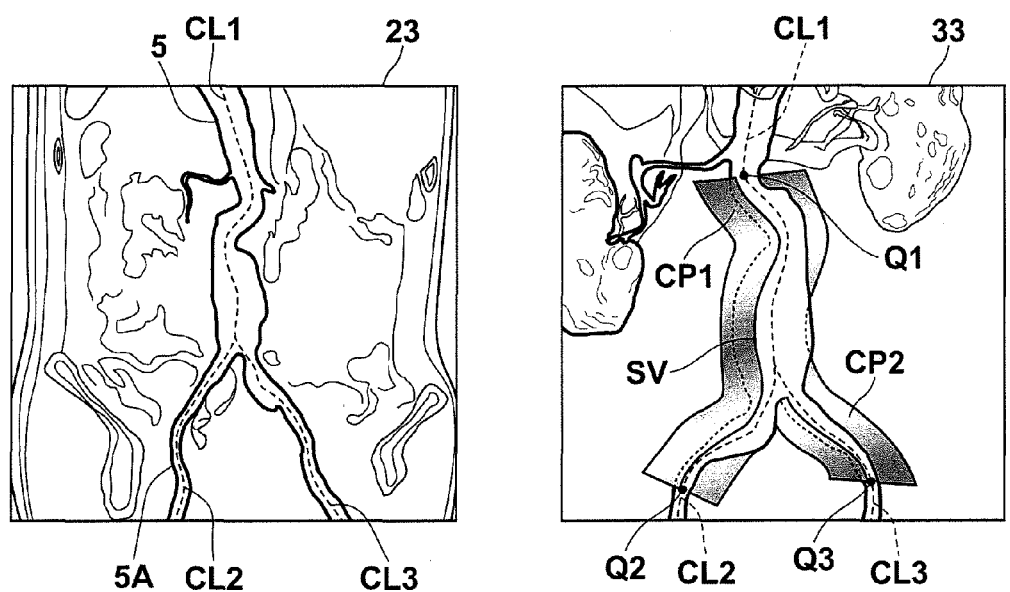
FIG. 6 illustrates an example of a pseudo three-dimensional image corresponding to a multi-path stretched CPR image.

CPR image generation means 102 may be adapted to present a stretched CPR image, projected CPR image, or multi-path CPR image, instead of straightened CPR image. FIG. 6 illustrates an example of multi-path CPR image 23 representing an abdominal aorta, right common iliac artery, and left common iliac artery, and example of pseudo three-dimensional image 33 obtained by applying the embodiment of the present invention to multi-path CPR image 23.

The multi-path CPR method is a method capable of representing a tubular tissue having a branch by a CPR image, as described in Non-patent Document 1. Multi-path CPR image 23 shown in FIG. 6 is a multi-path stretched CPR image in which each of the abdominal aorta, right common iliac artery, and left common iliac artery is generated by a stretched CPR method.

When CPR image generation means 102 is a means that generates a multi-path CPR image, CPR image generation means 102 sets a plurality of curved cutting surfaces to a tubular tissue. As shown in FIG. 6, tubular tissue 5 is extracted by tubular tissue extraction means 101 and core lines CL1, CL2, and CL3 of the aorta, right common iliac artery, and left common iliac artery respectively are set. Then, a user specification of an observation range is accepted on a pseudo three-dimensional image generated in advance, and end points Q1, Q2, and Q3 of the observation range are set on the core lines of the tubular tissue. CPR image generation means 102 generates multi-path CPR image by a known method based on information (tubular tissue 5, position of each candidate point and main axis direction at each candidate point, core line route, positions and orientations of cross-sections, and the like) obtained by tubular region extraction means 101.

Then, in the process of generating multi-path CPR image 23, CPR image generation means 102 sets a first curved cutting surface to a core line constituted by core line CL1 of the aorta and core line CL2 of the right common iliac artery, and separately sets a second curved cutting surface to CL3 of the left common iliac artery. Further, information for specifying longitudinal section 5A of the tubular region cut by the first and second curved cutting surfaces is calculated. Longitudinal section obtaining means 105 information, including information for specifying the first and second curved cutting surfaces, information of pixel range to be projected on the curved cutting surface, normal line direction at each position of the first and second curved cutting surfaces, information for specifying the longitudinal section from CPR image generation means 102 and supplies the obtained information to pseudo three-dimensional image generation means 103.

Pseudo three-dimensional image generation means 103 generates pseudo three-dimensional image 33 representing curved surface CP1 corresponding to the first curved cutting surface, curved surface CP2 corresponding to the second curved cutting surface, and the tubular tissue superimposed on top of each other. Then, generated pseudo three-dimensional image 33 is displayed by display control means 104. In the multi-path CPR image of FIG. 6, a contour of longitudinal section SV longitudinally cutting the tubular region is represented on curved surface CP1 corresponding to the first curved cutting surface and curved surface CP2 corresponding to the second curved cutting surface in a visually recognizable manner When the diagnosis assisting method of the present invention is applied to a multi-path CPR image, it can be understood by the mark how the multi-path image displayed by longitudinally cutting from a plurality of orientations by a plurality of curved cutting surfaces longitudinally cuts the tubular tissue, whereby a complicated positional relationship between the tubular tissue and longitudinal section represented by the CPR image may be understood easily.

In the extraction of the coronary artery region performed by tubular region extraction means 101, the method described in Japanese Unexamined Patent Publication No. 2006-167287 may be used. In the process of extracting the blood vessel region, the method disclosed in the aforementioned document extracts a core line of the blood vessel by a vessel tracking method and sets cross-sections orthogonal to the core line to extract contour points of the blood vessel. Thus, the core line and cross-sections are set automatically in the process of extracting the blood vessel. Any other known methods may also be used for extracting the coronary artery region and setting the core line and cross-sections.

As the pseudo three-dimensional image with a mark attached thereto, a pseudo three-dimensional image generated by any known methods, such as a surface rendering method instead of the volume rendering method, may be used.

When the mark of the present embodiment is a curved surface which includes the longitudinal section and has a certain width extending outside of the longitudinal direction of the tubular tissue, as shown in FIG. 4, the curved surface is not necessarily a surface representing the curved cutting surface. Also in this case, the orientation and position of the longitudinal section represented by the CPR image may be easily understood from the longitudinal section and the portion extending outside of the longitudinal direction of the tubular tissue.

The diagnosis assisting apparatus of the present invention may be configured by a plurality of computers to share the functions of the tubular tissue extraction means, CPR image generation means, pseudo three-dimensional image generation means, curved cutting surface control means, and display control means. As for the system components, such as the input device, display, and the like, any known devices may be used. For example, a joy stick may be used instead of the mouse and a touch panel may be used instead of the display.

What is claimed is:

1. A diagnosis assisting apparatus, comprising:
a tubular tissue extraction means for extracting a tubular tissue region representing a tubular tissue from volume data obtained by imaging and setting a core line to the tubular tissue;
a CPR image generation means for generating a CPR image which includes the core line and a longitudinal section of the tubular tissue region;
a longitudinal section obtaining means for obtaining the longitudinal section from the CPR image generation means;
a pseudo three-dimensional image generation means for generating a pseudo three-dimensional image that includes a mark representing the obtained longitudinal section, as well as the tubular tissue, in the extracted tubular tissue region based on the volume data; and
a display control means for causing the pseudo three-dimensional image having the mark to be displayed on a display device,
wherein the mark is shaded based on an angle of a normal line at each position of the longitudinal section.

2. The diagnosis assisting apparatus of claim 1, wherein the mark is a curved surface which includes the longitudinal section and has a certain width extending outside of a longitudinal direction of the tubular tissue.

3. The diagnosis assisting apparatus of claim 2, wherein the curved surface is a surface representing a curved cutting surface longitudinally cutting the tubular tissue projected onto the CPR image.

4. The diagnosis assisting apparatus of claim 3, wherein the size of the curved surface is a size corresponding to a display range of the CPR image.

5. The diagnosis assisting apparatus of claim 1, wherein the CPR image generation means is a means that generates a CPR image of the curved cutting surface of the tubular tissue region rotated with the core line of the tubular tissue as the axis of the rotation.

6. The diagnosis assisting apparatus of claim 1, wherein the display control means is a means that further causes the core line of the tubular tissue to be displayed in a superimposed manner.

7. The diagnosis assisting apparatus of claim 1, wherein a pixel value of each point constituting the mark represents a pixel value of each corresponding point of the CPR image.

8. The diagnosis assisting apparatus of claim 1, wherein the tubular tissue is a blood vessel or a bronchus.

9. The diagnosis assisting apparatus of claim 1, wherein only a portion of the pseudo three-dimensional image representing the tubular tissue within a predetermined distance from the core line is displayed.

10. A diagnosis assisting apparatus, comprising:
a tubular tissue extraction means for extracting a tubular tissue region representing a tubular tissue from volume data obtained by imaging and setting a core line to the tubular tissue;
a CPR image generation means for generating a CPR image which includes the core line and a longitudinal section of the tubular tissue region;
a longitudinal section obtaining means for obtaining the longitudinal section from the CPR image generation means;
a pseudo three-dimensional image generation means for generating a pseudo three-dimensional image that includes a mark representing the obtained longitudinal section, as well as the tubular tissue, in the extracted tubular tissue region based on the volume data; and
a display control means for causing the pseudo three-dimensional image having the mark to be displayed on a display device,
wherein the display control means is a means that causes the pseudo three-dimensional image having the mark and the CPR image to be displayed as a pair of images, and
wherein the pair of images is displayed in a manner in which the pseudo three-dimensional image having the mark is distinguishably included in a portion of the CPR image.

11. The diagnosis assisting apparatus of claim 10, further comprising a storage means for storing the pair of images.

12. A diagnosis assisting method, comprising the steps of:
extracting a tubular tissue region representing a tubular tissue from volume data obtained by imaging and setting a core line to the tubular tissue;
generating a CPR image which includes the core line and a longitudinal section of the tubular tissue region;
obtaining the longitudinal section from the CPR image;
generating a pseudo three-dimensional image that includes a mark representing the obtained longitudinal section, as well as the tubular tissue, in the extracted tubular tissue region based on the volume data; and
displaying the pseudo three-dimensional image having the mark,
wherein the mark is shaded based on an angle of a normal line at each position of the longitudinal section.

13. A non-transitory computer readable recording medium on which is recorded a program for causing a computer to function as:
a tubular tissue extraction means for extracting a tubular tissue region representing a tubular tissue from volume data obtained by imaging and setting a core line to the tubular tissue;
a CPR image generation means for generating a CPR image which includes the core line and a longitudinal section of the tubular tissue region;
a longitudinal section obtaining means for obtaining the longitudinal section from the CPR image generation means;
a pseudo three-dimensional image generation means for generating a pseudo three-dimensional image that includes a mark representing the obtained longitudinal section, as well as the tubular tissue, in the extracted tubular tissue region based on the volume data; and
a display control means for causing the pseudo three-dimensional image having the mark to be displayed on a display device,
wherein the mark is shaded based on an angle of a normal line at each position of the longitudinal section.

14. A diagnosis assisting method, comprising:
extracting a tubular tissue region representing a tubular tissue from volume data obtained by imaging and setting a core line to the tubular tissue;
generating a CPR image which includes the core line and a longitudinal section of the tubular tissue region;
obtaining the longitudinal section from the CPR image generation means;
generating a pseudo three-dimensional image that includes a mark representing the obtained longitudinal section, as well as the tubular tissue, in the extracted tubular tissue region based on the volume data; and
displaying, as a pair of images, the pseudo three-dimensional image having the mark and the CPR image,
wherein the pair of images is displayed in a manner in which the pseudo three-dimensional image having the mark is distinguishably included in a portion of the CPR image.

15. A non-transitory computer readable recording medium on which is recorded a program for causing a computer to function as:
a tubular tissue extraction means for extracting a tubular tissue region representing a tubular tissue from volume data obtained by imaging and setting a core line to the tubular tissue;
a CPR image generation means for generating a CPR image which includes the core line and a longitudinal section of the tubular tissue region;
a longitudinal section obtaining means for obtaining the longitudinal section from the CPR image generation means;
a pseudo three-dimensional image generation means for generating a pseudo three-dimensional image that includes a mark representing the obtained longitudinal section, as well as the tubular tissue, in the extracted tubular tissue region based on the volume data; and
a display control means for causing the pseudo three-dimensional image having the mark to be displayed on a display device,
wherein the display control means is a means that causes the pseudo three-dimensional image having the mark and the CPR image to be displayed as a pair of images, and
wherein the pair of images is displayed in a manner in which the pseudo three-dimensional image having the mark is distinguishably included in a portion of the CPR image.

* * * * *